United States Patent [19]
Andre et al.

[11] Patent Number: 6,029,579
[45] Date of Patent: Feb. 29, 2000

[54] GUIDE SYSTEM ALONG AT LEAST ONE GROUND RAIL FOR A ROAD VEHICLE AXLE

[75] Inventors: Jean-Luc Andre, Obernai; Martin Koerber, Mutzig, both of France

[73] Assignee: Lohr Industrie, Hangenbieten, France

[21] Appl. No.: 09/020,867

[22] Filed: Feb. 9, 1998

[30] Foreign Application Priority Data

Feb. 11, 1997 [FR] France .................................. 97 01709

[51] Int. Cl.⁷ .................................................. B61C 11/00
[52] U.S. Cl. ......................... 105/72.2; 104/243; 104/244
[58] Field of Search .................................... 104/242, 243, 104/244, 245; 105/141, 144, 145, 72.2, 73

[56] References Cited

U.S. PATENT DOCUMENTS

| | | | |
|---|---|---|---|
| 3,180,280 | 4/1965 | Kuch et al. ............................. | 104/245 |
| 5,704,295 | 1/1998 | Lohr ....................................... | 105/72.2 |
| 5,758,583 | 6/1998 | Lohr ....................................... | 105/72.2 |
| 5,845,581 | 12/1998 | Svensson ................................ | 105/145 |

*Primary Examiner*—S. Joseph Morano
*Assistant Examiner*—Robert J. McCarry, Jr.
*Attorney, Agent, or Firm*—Davis and Bujold

[57] ABSTRACT

The guide system, for a guided road vehicle, having a front directional assembly formed of two pivoting guide arms (2) and (3) which are coupled as well as vertically constrained, each equipped with an inclined guide wheel (12, 13) engaging at least one guide rail on the ground (16). At the rear, a follower-limiter module (47) designed to limit lateral clearance by the axle to a maximum value, in the form of a device following the guide rail, is pivotably attached to the axle (8) and laterally displaceable to a limited extent. The front directional unit and the follower-limiter module (47) are laterally connected to either side of the axle through a lateral temporary immobilizing device (43, 44) which controls change of position.

17 Claims, 6 Drawing Sheets

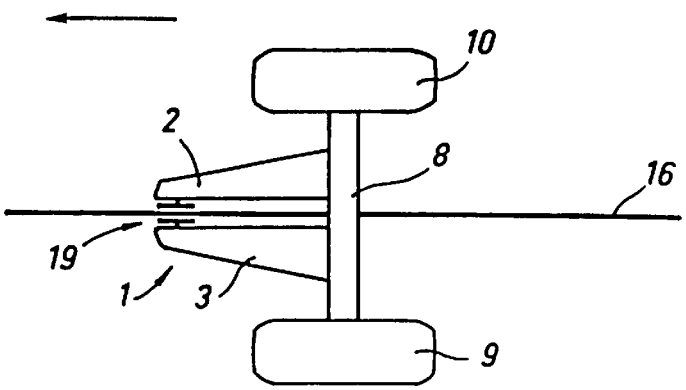
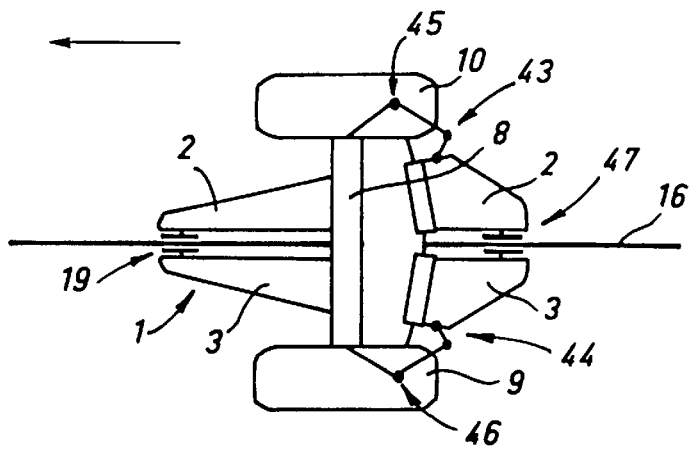
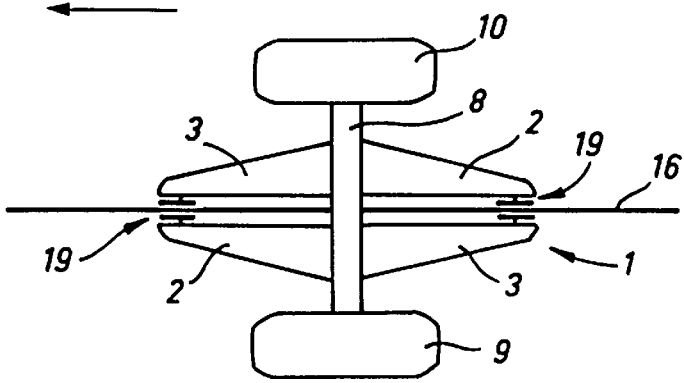
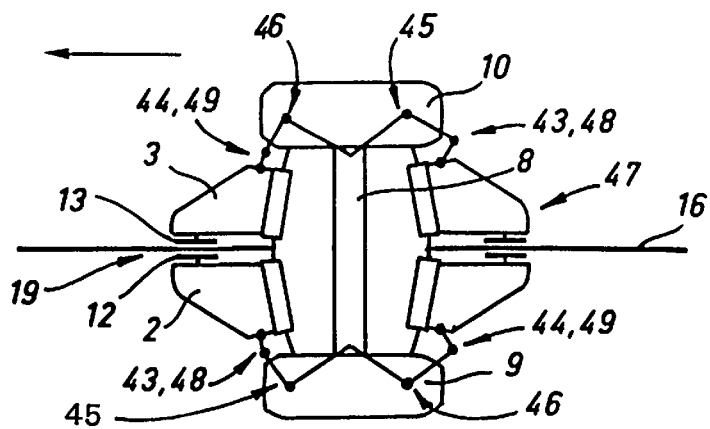

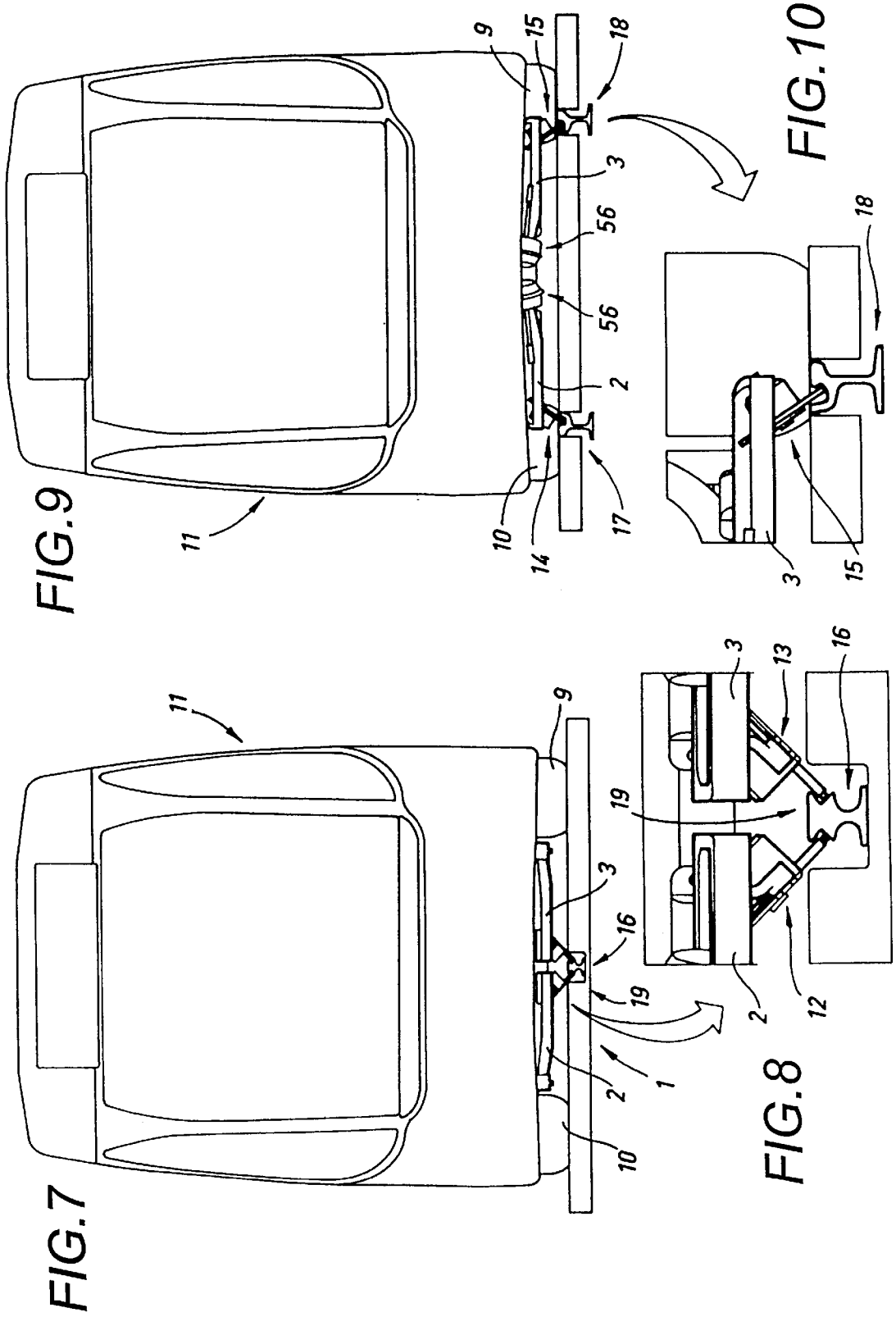

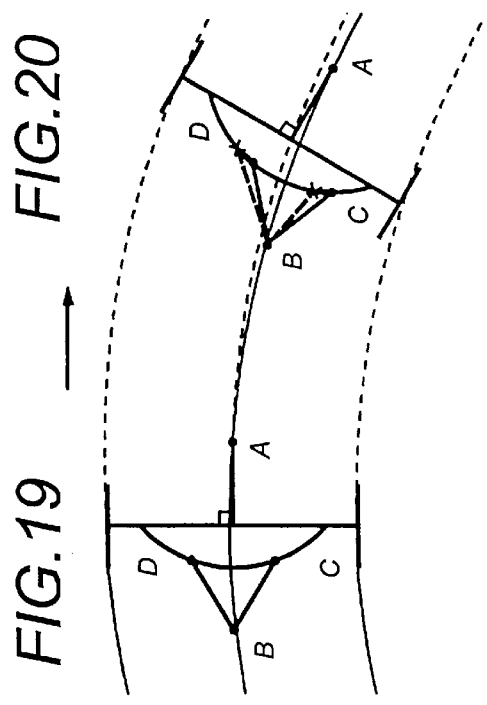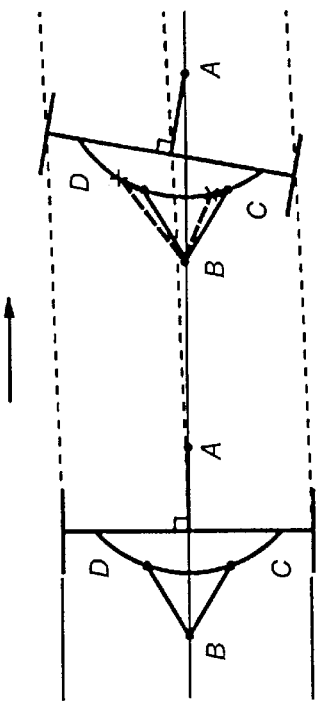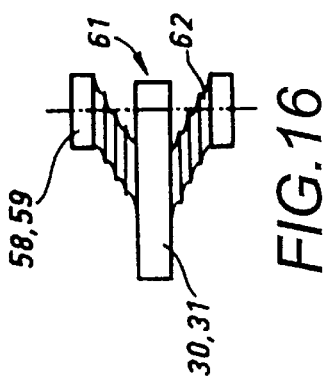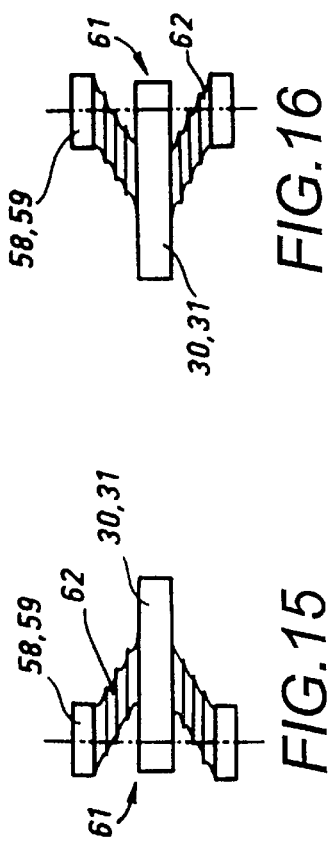

GUIDE SYSTEM ALONG AT LEAST ONE GROUND RAIL FOR A ROAD VEHICLE AXLE

This invention concerns a guide system for road vehicles using guide wheels dependent upon at least one ground guide rail.

BACKGROUND OF THE INVENTION

Vehicles on wheels are often guided by supplemental wheels transverse to the main wheels. These supplemental wheels move on a lateral course and assume lateral stress on curves. The tires on the main wheels are not subjected to any lateral stress, or at the most, are subjected to only very slight residual stress.

This is the case, for example, with subway cars on tires.

Each tire can certainly assume some lateral stress. All the tires on road vehicles are subjected to lateral acceleration during turns, which deforms the sides of the tires temporarily. This stress is assumed primarily by the tires.

In the case of a vehicle being guided along one or more ground rails, if there is a loss of traction or if the tires are defective, they can no longer assume the lateral stress, and the axle begins to shift laterally.

SUMMARY OF THE INVENTION

According to the invention, to eliminate lateral shifting which may arise due to decreased tire traction, a slight degree of lateral clearance is permitted, extending as far as a predetermined angular deviation between the axle and a follower-limiter module which travels on the same ground rail or rails.

This limitation maintains the lateral clearance at an acceptable level and prevents the vehicle from further deviation.

The goal of the present invention is to control the axle directly using a front guide assembly with two identical arms engaged in movement along a guide rail on the ground. Another goal is to limit lateral axle clearance to a maximum value if the tires lose traction.

The limiting assembly is operative only if the tires no longer adhere, if there is slippage, or in some similar situation.

By varying the directional unit, the invention can utilize the guide rails provided for public urban railway systems.

BRIEF DESCRIPTION OF THE DRAWING

Other characteristics and features of the invention will be apparent from the following description, given by way of example, and the accompanying drawings, in which:

FIG. 1 is a schematic view showing the basic version of the invention;

FIG. 2 is a schematic view showing a version with a lateral shift limiting mechanism;

FIG. 3 is a schematic view showing a reversible version;

FIG. 4 is a schematic view showing the reversible version with a lateral shift limiting mechanism;

FIG. 7 is an elevation of a vehicle equipped with the guide assembly shown in FIG. 5;

FIG. 8 is a detailed elevation view of the above guide assembly;

FIG. 9 is an elevation of a vehicle equipped with the guide assembly consisting of two separated guide wheels configured so that the wheels each roll along the side of a tramway rail;

FIG. 10 is a detailed elevation of the above guide assembly;

FIG. 13 is an enlarged schematic view of one example of a temporary immobilization device;

FIG. 14 is a plan view of the pivoting articulation zone of a guide arm;

FIG. 15 is a plan view of one realization of the bearing connection of one guide arm blocked on the right;

FIG. 16 is a plan view of one realization of the bearing connection of one guide arm blocked on the left;

FIGS. 17 and 18 are comparative schematic illustrations showing two stages of straight line movement with the maximal lateral clearance allowed by the follower-limiter module; and FIGS. 19 and 20 are comparative schematic illustrations showing two stages of turning with the maximal lateral clearance allowed by the follower-limiter module.

DETAILED DESCRIPTION OF PREFERRED EMBODIMENTS

When the tires begin to lose traction, the axle moves away from the proper position, representing a lateral separation or shifting (clearance).

An object of this invention is to limit this lateral clearance to a maximum value.

Figure 5:
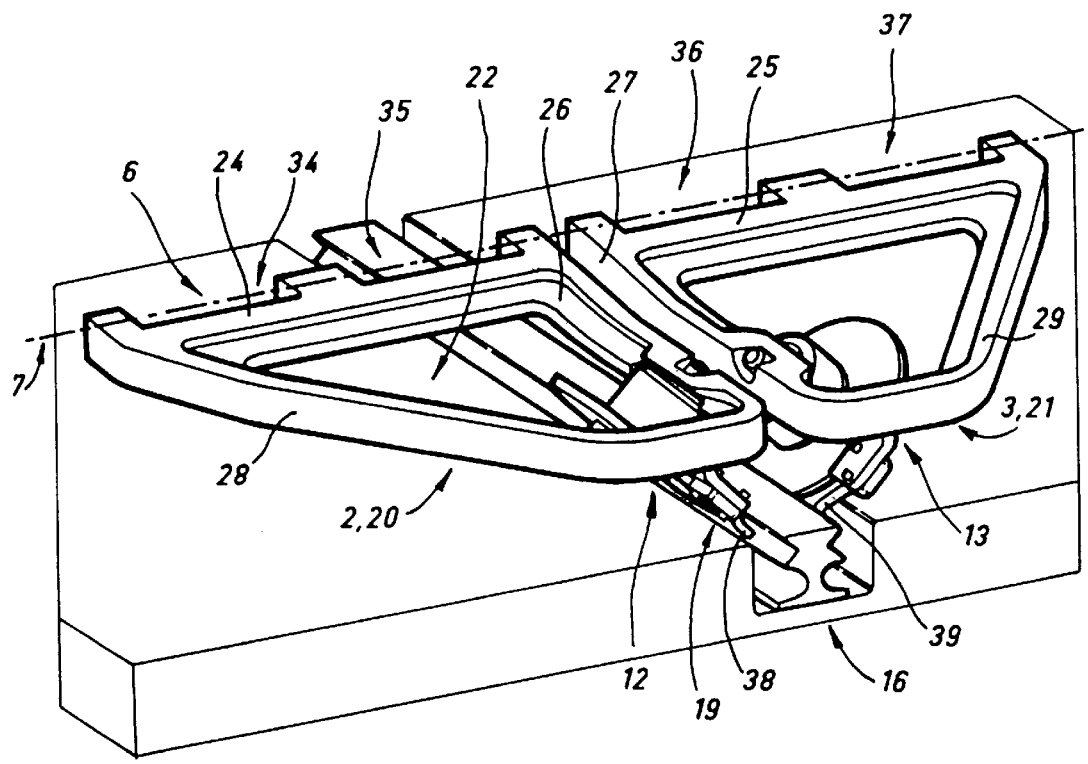
FIG. 5 is a perspective view of the guide assembly in its simplified version.
Figure 6:
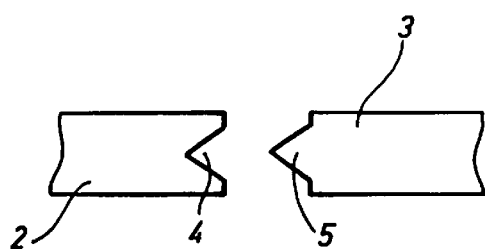
FIG. 6 is a simplified cut-away view showing an example of the transverse coupling of the arms at the two opposite sides.

In FIGS. 1–4, an arrow shows the direction of movement, the guide system with reference to the drawings the invention consists, in the basic version of FIG. 1, of a guide assembly 1 formed of two identical guide arms 2 and 3, which are juxtaposed and coupled, for example, by the engagement of complementary opposing lateral structures such as a notch 4 and an interlocking pointed element 5 (FIG. 6). Arms 2 and 3 are articulated at one end to an articulation 6 (FIG. 5) pivoting about a transverse axle 7 attached to a drive axle 8 of a road vehicle joining two wheels 9 and 10, for example, on an intermediate module 11 (FIG. 7) of a public railway transport train. This pivoting articulation 6 is designed to absorb pitching motions.

Each arm 2 and 3 has at its other extremity an inclined guide wheel 12, 13 or 14, 15, each engaged to move along a path formed in one of the sides of either a central ground guide rail 16 or two ground guide rails 17 and 18.

Note that some variations have closely set inclined guide wheels 12, 13 forming a central pair 19 (FIGS. 7 and 8), while other variations have widely spaced or separated inclined guide wheels 14, 15 (FIGS. 9 and 10).

One of the embodiments of guide arms 2 and 3 of the guide assembly 1 is shown in FIG. 5.

This embodiment consists of two identical arms which are generally triangular, with the body of each arm consisting of a triangular, mechanical perimeter element 20, 21 surrounding an empty central area 22, 23.

This generally rectangular triangle comprises a transverse base 24, 25 situated near the axle or axle block 8, an interior side 26, 27 which is generally perpendicular to the base, and an inwardly curved oblique side 28, 29 connecting the first two sides.

Each arm is pivotably attached by the base 24, 25 of its triangular perimeter 20, 21 to axle 7, which is transverse to the vehicle. Guide arms 2, 3 are functionally integral in orientation with the road axle or axle block 8 and therefore control it directly.

Insofar as pivoting articulation 6 is concerned, it may consist of a single pivot axle 7 for both arms, or two physically separate axles, or a series of axle elements 30, 31 and 32, 33 disposed one after the other in succession and respectively supported by the bases 24, 25 of each arm 2 and 3.

For this purpose, each base 24, 25 has on the side of axle block 8 two crenelated openings 34, 35 and 36, 37 whose side extremities support the extremities of the axle elements.

According to a preferred mode of execution, each interior side 26, 27 of each triangular perimeter which is perpendicular to corresponding base 24, 25 supports near its front extremity a freely rotating inclined guide wheel 12, 13 or 14, 15 protected by a deflector 38, 39 which acts as a wheel guard.

These two wheels are preferably located opposite each other. When they are closely spaced (wheels 12, 13), they form central coupling 19, with the two inclined guide wheels forming a downward-pointing V engaging the lateral guides on the sides of the same central ground guide rail 16 (FIGS. 8 and 9).

When separated guide wheels (wheels 14, 15) are provided, they slant in the opposite direction and the wheels roll along guides formed in the two opposite sides of the two rails 17 and 18, which are separated from each other. This application primarily concerns the two rails on a tramway, as shown in FIGS. 9 and 10.

As already shown, the arms are coupled at the level of the guide wheels by a transverse elastic recall means (not shown) . For the central coupling 19 of closely spaced wheels, this means consists of a force pushing them together. For the separated guide wheels 14, 15, the means consists of a force pushing the arms apart.

In addition, the arms, and consequently the guide wheels, are subjected to a vertical constraint which, together with the force pushing together or separating the arms, maintains each wheel in contact with the track along which it moves.

The wheels are constrained vertically downward by an individual or common shoe 40 contacting the two arms simultaneously. Thus, the wheels are constantly maintained on the guide elements by the forces pushing them together and downward, eliminating any possibility of derailment.

The same method can be adapted for use on the unit using separated guide wheels.

In the variation shown, the contact shoe consists of a spring-blade 41 with a broad tip 42 acting simultaneously on the two arms 2, 3 near guide wheel coupling 19.

In each case, the two guide arms are integral with the axle or made integral with it so they can turn it directly.

Figure 11:
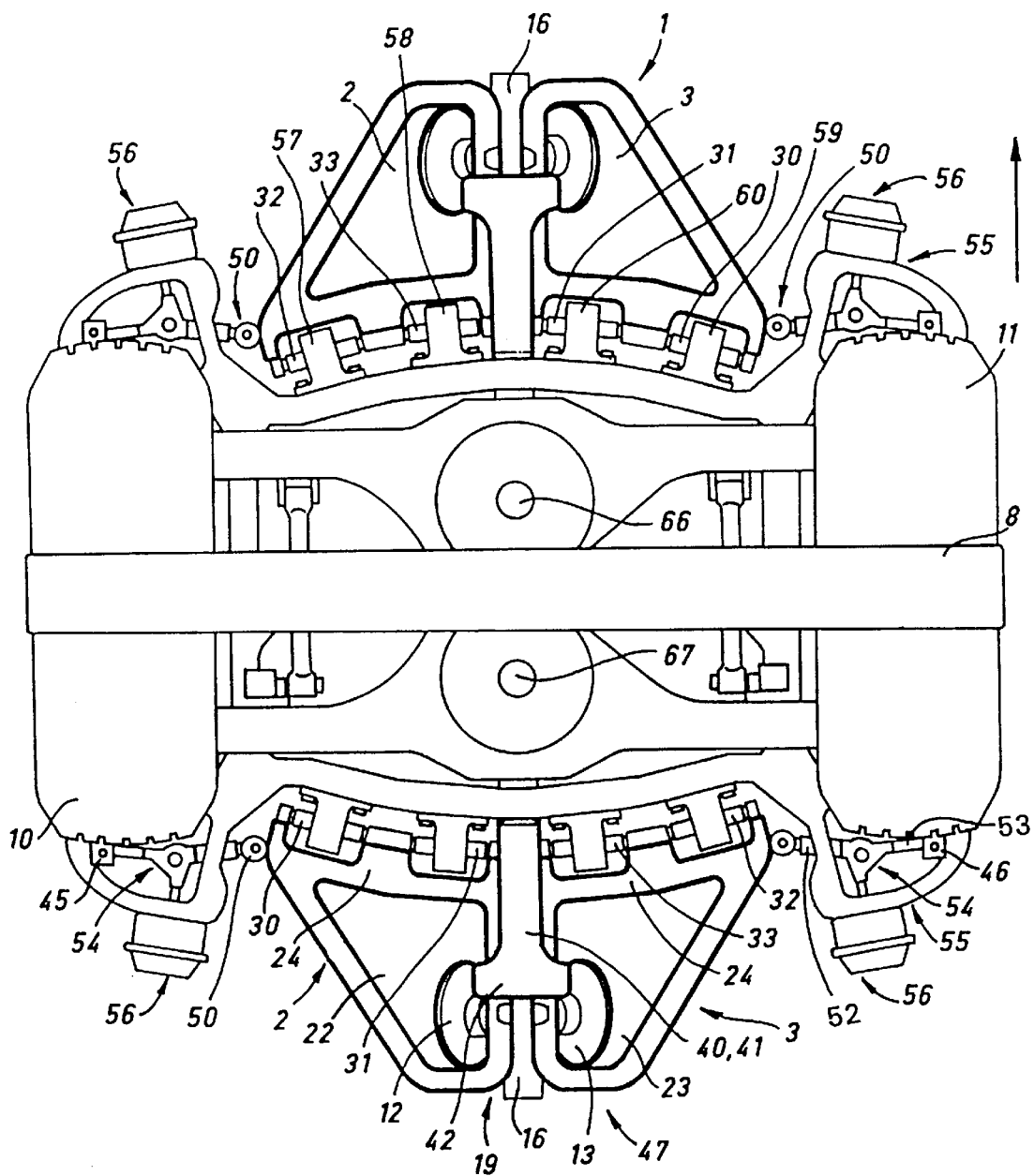
FIG. 11 is a plan view of the reversible guide assembly with a clearance limiter according to a specific technological realization.
Figure 12:
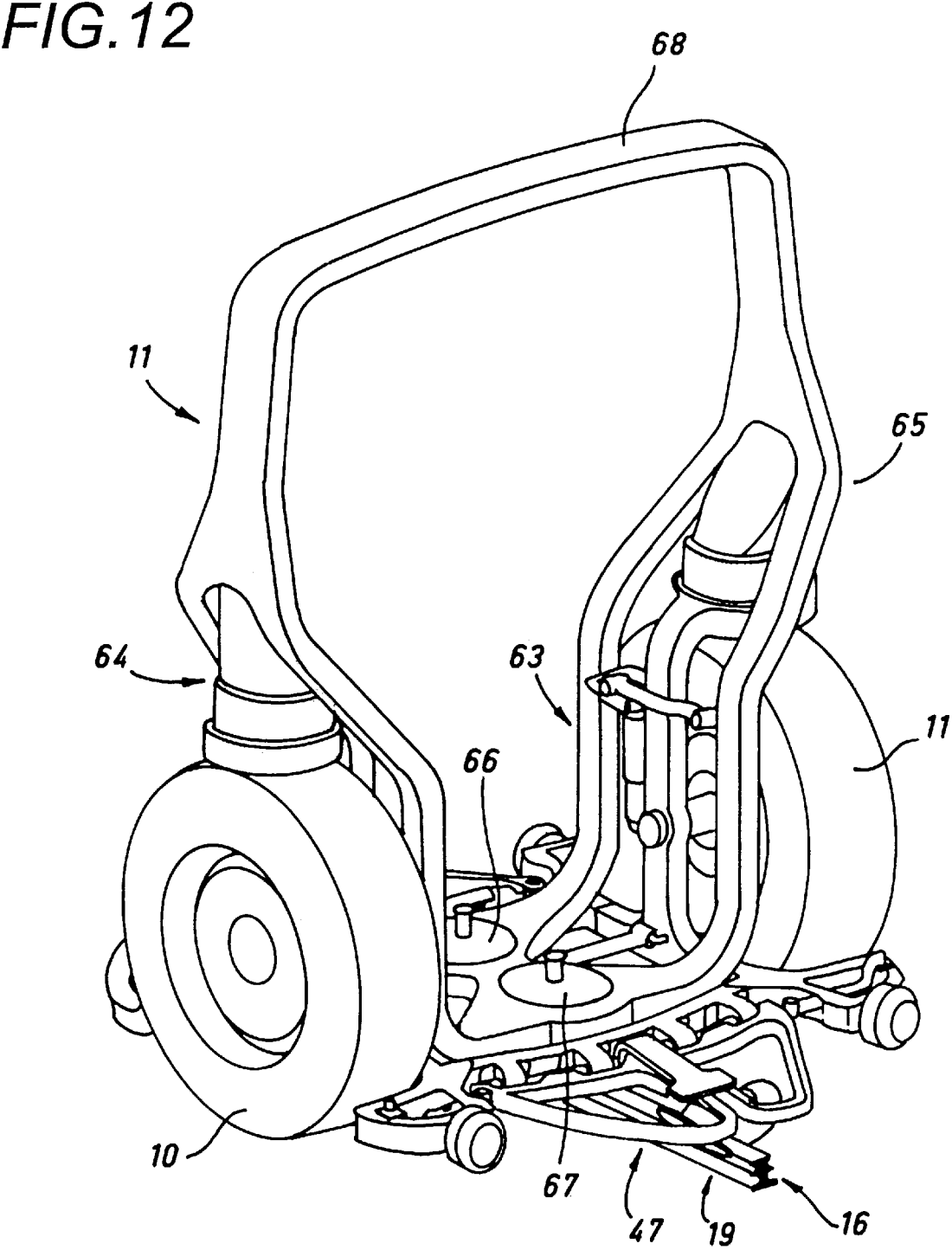
FIG. 12 is a perspective view of an intermediate module without the body, showing the axle and the front unit of the reversible guide assembly with a clearance limiter.

According to the variation shown in FIGS. 4, 11 and 12, the guide assembly is blocked in direction in relation to the axle by two immobilizing connectors in the form of two lateral immobilizing devices 43 and 44 articulated between one of the arms and a point that is fixed in relation to the axle block, for example, between the outside extremity of each base 24, 25 of the triangular perimeter 20, 21 and a piece 45, 46 that is fixed in relation to the axle block placed near the wheel.

One execution of these lateral immobilization devices is described below.

If one wishes to guide the vehicle in two directions, forward and reverse, it is possible to provide an identical guide assembly 1 at the front and at the rear; however, the two units do not work simultaneously (FIG. 3).

If there is both reversible function and a lateral clearance follower-limiter module 47 for the axle, as described below, lateral immobilization is supplied only temporarily by the two immobilization devices 43, 44. Changeable immobilization devices, such as locking devices 48, 49, are used. These immobilization devices are locked at the front in the direction of operation shown by an arrow in the drawings. Thus, two functions can take place in succession: one at the front, guiding the vehicle in the direction of operation, and one at the rear, limiting lateral axle clearance using another identical or similar type of unit at the rear (FIG. 4).

One of the extremities of the controlled lateral immobilization device is telescoping, and may or may not include shock absorption means, allowing the guide assembly to be blocked in relation to the axle. In addition, because it telescopes, it can absorb lateral motions on sharp turns.

It may consist of a mechanical connector with a telescoping head 50, 51, one end of which is articulated to the fixed piece 45, 46 which may be integral with the axle, and the other end of which is articulated to the adjacent side of the guide arm. Each of these connections may consist of a mechanical device which may be articulated using two connector rods 52, 53 interconnected by an intermediate articulation 54 which would be immobilized on command by a suitable lock forming a ball and socket articulation 55 (FIG. 13).

Changing the connector from locked to unlocked position is accomplished using an active bidirectional device 56 with a control shaft connected to intermediate articulation 54. This shaft transmits a force which re-aligns the ball and socket articulation, freeing the connection. In practice, it is well known that when the articulations of a ball and socket joint are aligned, it is blocked.

The front guide assembly 1 described herein is integrated into a more general guide system incorporating a lateral clearance limiter, which will now be described.

Front guide assembly 1, mounted on the front in the direction of movement, may be completed by a module obligatorily situated at the rear. This rear lateral clearance limiter, floating on the axle block and dependent upon guide rail 16, is the module previously referenced as numeral 47. Hereafter, it will be called the follower-limiter module (FIGS. 2, 4, 11 and 12).

This follower-limiter module 47 may be formed, according to the invention, of the same elements already described above. Thus, since they are identical, the same references will be used.

It also consists of two pivoting arms 2 and 3, for example, generally triangular in shape, with the base 24, 25 of each arm pivotably articulated about a transverse axle 7 or a series of axle elements 30 through 33 transverse to the vehicle. The free end of each arm is equipped with an inclined guide wheel which follows the guide rail or rails. There may be a pair 19 of inclined guide wheels forming a downward pointing V engaging a single, central ground guide rail 16, or there may be two independent inclined guide wheels 14, 15 forming an upward pointing V and engaging two separate and independent guide rails 17 and 18 located near the wheels on axle 8, said rails constituting the track for a public urban railway system.

The arms are coupled by a transverse mechanical connector, for example, the arrangement shown in FIG. 6, and by a transverse force either pushing them together (in the case of a central unit of guide wheels) or separating them (in the case of two spaced apart, independent guide wheels).

The unit formed by the two arms 2 and 3 is pushed downward by a vertical constraint such as, for example, elastic or hydraulic force exerted against the two arms, perhaps simultaneously, by a blade-spring 41 with a broad tip 42 as previously described with reference to guide assembly 1.

The two arms 2 and 3 are pivotably articulated about axle 7 or the succession of axle elements 30 through 33 in a generally transverse direction. These axles serve as a guide for transversely displacing the arms along an arc corresponding to the degree of angular separation tolerated to limit lateral clearance.

To accomplish this, the geometric outline of the succession of axle elements of follower-limiter module 47 is an arc CD centered on the mid-point A of the segment connecting the two contact points of the front guide wheels.

The same mid-point for the rear wheels is referenced as point B.

According to the technological construction methods used in the variation shown, the elements forming pivot axle 7 and disposed in an arc CD with mid-point A and supported by fixed bearing elements 57, 58 for arm 2 and elements 59, 60 for arm 3 are integral with axle block 8 and fan out radially from center A. The pivoting connection is the articulation formed of the succession of rectilinear axle elements forming an arc, as shown in FIG. 11.

The extremities of the axle elements are supported by the transverse portions of the crenelated openings 34 through 37 formed in the bases 24 and 25 of the triangular pieces forming guide arms 2 and 3.

According to the preferred embodiment, the connection between the fixed bearing pieces and the axle elements is a deformable articulation such as articulation 61 with low axial resistance, that is, low resistance in the general direction of the axle element, but with high radial resistance.

One example of an embodiment of this type of connection is shown in FIGS. 14 through 16. There is a succession of identical deformable articulations such as articulation 61, each consisting, for example, of a flexible structure formed of a juxtaposition of plates such as flat or tubular plates 62, made of elastomeric material and joined to each other by a connecting layer.

Each deformable articulation 61 is deformed axially, as shown in FIGS. 15 and 16, by an axial separation means until it reaches the maximum displacement predetermined by construction.

This composite structure affords considerable resistance to transverse deformation; it is formed of an alternating succession of thin flexible plates and layers made using a rubber deposition method, providing a plate-like connecting structure between each bearing piece 57 through 60 and the adjacent axle element. Conversely, scissor-like deformation offers only slight resistance, which is also the result of this structure.

Thus, it is possible for the connector to possess a high degree of transverse deformability in relation to the vehicle and a low degree of longitudinal deformability, which is particularly useful for the work of the various elements comprising limiter-follower module 47, as will be seen below.

The unit formed of the two arms 2 and 3 of limiter-follower module 47 is attached so that it floats in relation to axle 8, as described above, on either side of the straight line position, within a small area of angular clearance defined by the course of each bearing piece until it reaches the maximum extended position.

Limiter-follower module 47 may be completed by two temporary maintenance connectors in a central position on the two-arm unit. This may be accomplished using two controlled temporary lateral immobilization devices to switch positions. This connection provides a technical locking means for temporarily blocking the device while it is used as a guide assembly.

These temporary lateral immobilization devices may be made using various techniques, particularly the ball and socket technique described above and shown in the drawings.

For example, each connection consists of two rods, articulated in succession at an intermediate articulation point to form a ball and socket type articulation.

The free end of one of the rods is articulated at a fixed point integral with the axle block. The free end of the other rod is preferably articulated to the side of the lower portion of the connecting side of each arm.

The rod near the side of the arm has one telescoping extremity allowing it to extend farther.

This connection constitutes a deformable triangle, with the rods constituting its sides, the ball and socket articulation forming the apex, and the space between the two free ends forming the base. The triangle deforms automatically when the angle of the rods changes due to the angular deviation of the follower-limiter module. According to the invention, this deformation provides the necessary angular separation on turns and, in combination with the deformable articulations, the angular separation which represents the angular clearance tolerated.

When there is lateral clearance, the limiting positions which define maximum angular deviation correspond to the end point of the course of the pivot axle elements on either side of the central position they occupy on a straight line.

The limiter module 47 may be immobilized in the central position when it is blocked due to alignment of the rods. For this purpose, as already described, the common articulation is connected to an exterior control means by a control shaft actuated to be pushed or pulled by a bidirectional motor, thereby blocking or releasing the connection.

Blocking the two ball and socket connections makes follower-limiter module 47 equivalent to front directional unit 1.

Thus, a simple command can switch the directional unit from the rear to the front, that is, by a simple locking-unlocking command, front directional unit 1 can become a follower-limiter module 47, and conversely.

This allows the vehicle to move in reverse at will.

This function is also possible with the variation shown in FIG. 3.

Thus, the unit is completely reversible.

The guide system of the invention consists of different variations which can be more or less complex.

First, there is the base variation. It comprises only a directional unit 1 with two pivoting arms 2 and 3, as described at the beginning (FIG. 1).

Next, there is another variation without a lateral clearance limiter which can operate in both directions (FIG. 3).

There is also a variation with a lateral clearance follower-limiter 47 allowing limited clearance in the rear, which has a front directional unit 1 that is either similar in type or equivalent to the base variation, and a rear follower-limiter module 47 like the one described. Front directional unit 1 is functionally rigid in the same direction as the axle (FIGS. 2 or 4).

A further variation is the reversible variation with a follower-limiter 47, that is, it incorporates a directional unit 1 at the front and a follower-limiter module 47 at the rear, which are both identical (FIG. 4). In this embodiment, directional unit 1 is rendered functionally rigid in the direction of axle 8 using controlled locking-unlocking devices 43, 44 to temporarily immobilize it (FIGS. 10 and 11).

There is an additional category of embodiments, in which each variation also has guide wheels that can be extracted from the guide rail or rails. This embodiment uses a raisable directional unit 1 or a directional unit 1 in combination with a follower-limiter module 47 which can both be raised.

To raise one of the units, the controlled temporary immobilization devices 43, 44 are merely released and the guide unit 1 and/or the follower-limiter module 47 are tilted up using a motor.

Only directional unit 1 functions conventionally, since it is made to be functionally rigid in orientation with axle 8. Thus, it governs the axle directly. Its angular variations as it follows the curves on the guide rail or rails impose a corresponding orientation on axle 8.

According to a particular embodiment shown in FIGS. 11 and 12, the guide system with lateral clearance limitation is attached to self- supporting intermediate module 11 with an axle 8 placed between two successive cars of a public railway transport system.

In these drawings there are two identical units: front unit 1 serving as a guide assembly, and rear unit 47 serving as a follower-limiter module, as well as bases 24, 25 of triangular arms 2 and 3 forming crenelated openings 34 through 37, and axle elements 30 through 33 traversing bearing pieces 57 through 60.

Front unit 1 is directionally immobilized in relation to axle 8 by two controlled temporary immobilizing devices 43, 44 which have been blocked by bidirectional control means 56. The blocked state exists when the rod articulations which form the ball and socket connections are in alignment.

This connection remains blocked until bidirectional control means 56 exerts a lateral force provoking the re-alignment of intermediate articulation 54 of the ball and socket.

The rear assembly is identical, but it serves as a follower-limiter module 47. To do this, temporary immobilization devices 43, 44 are unblocked, that is, the articulations of ball and socket 55 are re-aligned and left floating by bidirectional control means 56 which changes the state of the ball and socket connection. This connection varies in length and can adapt to the length required between fixed point 45, 46 and the articulated joint on the side of the adjacent arm to accommodate the various angular inclinations by the arm unit within the plane of the arms.

Other features of self-supporting intermediate module 11 are its U-shaped axle 63, upper suspensions 64, 65, and two pivot centers 66, 67 between the cars, as well as closed frame 68. These relate to the public transportation system application, where there are of several cars connected to an intermediate module.

The variation which includes the lateral clearance limiter functions in the following manner. As seen before, according to this variation, front directional unit 1 is directionally immobilized in relation to the axle using any suitable means, particularly the means described which consist of temporary immobilization devices 43, 44.

The lateral clearance limiter assumes its role when there is a momentary loss of traction or slippage, a problem with the wheels, cross wind, or some other cause of lateral movement.

A typical example is shown in schematic drawings 17 through 20.

When the tires begin to lose traction, the axle distances itself from its proper position, a displacement which represents lateral clearance.

In accordance with the invention, it is desirable to limit this lateral clearance to a maximum value.

The various elements perform as follows:

The controlled lateral immobilizing devices 43, 44 situated in the rear, that is near limiter module 47, are released. Rods 52, 53, thus freed to move, allow follower-limiter module 47 to vary slightly in direction because it is attached so that it floats in relation to axle block 8.

A lateral shift by the axle causes lateral clearance and consequently, the displacement of bearing elements 57 through 60 on the axle elements through deformable articulations 61.

The amplitude of the lateral clearance movement caused by the disturbance may be smaller than the corresponding angular course and may cause only limited deformation in deformable articulation 61. In this case, the threshold is not reached. This may be the result of a normal clearance during a turn or a lateral shift of small amplitude.

The purpose of the schematic views in FIGS. 17 through 20 is to simply illustrate how clearance is limited during straight line movement and during turns when sliding or skidding.

The solid lines represent the normal trajectory of the wheels on the axle, while the dashed lines represent a deviant trajectory, that is, with lateral clearance by the axle if it is out of joint with the axle inclined. The central line represents the guide rail. It indicates the direction to be followed. The adjacent lines or curves show deviant trajectories of the axle center on a straight line and on a turn. A and B denote the points situated in the middle of the segment between the contact points of the front and rear guide wheels, respectively, and CD denotes the arc with mid-point A.

Deprived of traction, the tires slide or skid, and the axle becomes offset. To show lateral shifting on a straight line, a diagonal trajectory is illustrated. With lateral shifting on a turn, the trajectory is slightly offset.

Observation of FIGS. 17 and 18 reveals that a slight inclination by the axle translating the maximum clearance allowed by the system corresponds to the maximum angular separation of the rear arms of the follower-limiter module along an arc CD with mid-point A formed at the rear of the axle.

The courses on either side of arc CD, that is, the arc interval between the straight line position and the clearance limit position are each shown by a bold line.

This clearance limit originates from the maximum extension by the deformable articulation in relation to its median straight line position.

Observation of FIGS. 19 and 20 shows the same phenomena of re-alignment of the axles of the of the front and rear arms. The lateral follower-limiter module 47 on the axle limits the extent to which the axle moves out of joint by stopping it when it exceeds a certain threshold value.

We claim:

1. A guide system connected to an axle of a vehicle, comprising, a guide assembly with two inclined guidance wheels displaceable along at least one ground guide rail provided in the ground;

wherein the guide assembly is a directional unit (1) formed of two separate adjacent arms (2 and 3) which are each separately pivotable about an axis (7) extending transverse of the vehicle; each of the two separate adjacent arms (2 and 3) supports an inclined guidance wheel (12, 13 or 14, 15) adjacent a free extremity thereof which is engageable for movement along said at least one ground guide rail; a coupling restraint acts on the two separate adjacent arms (2 and 3) and a contact shoe biases both of the two separate adjacent arms (2 and 3) toward engagement with the at least one ground guide rail to facilitate constant engagement therewith during use of the guide system.

2. A guide system according to claim 1, wherein the coupling restraint comprises a transverse elastic force and a disconnectable mechanical arrangement which provide a temporary transverse connection for the two separate adjacent arms (2 and 3).

3. A guide system according to claim 1, wherein the guide rail consists of one central rail (16) and the inclined guidance wheels (12, 13) are located adjacent one another and form a downward pointing V coupling (19) which engages with the one central rail (16).

4. A guide system according to claim 1, wherein two spaced apart guide rails (17, 18) are provided and the inclined guidance wheels (14, 15) are spaced apart from one other and are inclined in an upward pointing V configuration, and one of the inclined guidance wheels (14 or 15) engages with a first of the two spaced apart guide rails (17 or 18) and another of the inclined guidance wheels (15 or 14) engages with a second of the two spaced apart guide rails (18 or 17).

5. A guide system according to claim 1, wherein two immobilization devices interconnect a portion of the guide assembly (1) with the axle (8).

6. A guide system according to claim 5, wherein each of the two immobilization devices has a switch which allows each of the two immobilization devices to be switched to one of an active state and an inactive state.

7. A guide system according to claim 6, wherein when the two immobilization devices are active, the two immobilization devices provide temporary immobilization.

8. A guide system according to claim 5, wherein each of the two immobilization devices comprises a ball and socket articulation (55), each ball and socket articulation is formed of two articulated rods joined by a central articulation, and each ball and socket articulation is respectively articulated at one end to a point (45, 46) fixed in relation to the axle and at an opposite end to one of the two separate adjacent arms (2 and 3), and the central articulation is transversely displaced by a control shaft actuated by a bidirectional motor (56).

9. A guide system according to claim 8, wherein the end of the two articulated rods located adjacent the guide arm is telescoping.

10. A guide system according to claim 1, wherein the guide system includes first and second identical directional units each of which comprises two separate adjacent arms (2 and 3) which are each separately pivotable about an axis (7) extending transverse of the vehicle; each of the two separate adjacent arms (2 and 3) supports an inclined guidance wheel (12, 13 or 14, 15) adjacent a free extremity thereof which is engageable for movement along a guide path of at least one ground guide rail; a coupling restraint acts on the two separate adjacent arms (2 and 3) and a contact shoe biases both of the two separate adjacent arms (2 and 3) toward engagement with the at least one ground guide rail to facilitate constant engagement therewith during use of the guide system, and the first directional unit is provided in front of the axle and the second identical directional unit is provided behind the axle to facilitate control of the axle forward and reverse travel directions.

11. A guide system according to claim 10, wherein the first directional unit is provided with an immobilization device and the second identical directional unit is provided with an immobilization device, and the immobilization device on the first directional unit is normally locked and the immobilization device on the second directional unit is normally unlocked during operation.

12. A guide system according to claim 1, wherein the guide system further includes a follower module (47) provided with a pair of guidance wheels, the follower module (47) is provided behind the axle, and the pair of guidance wheels engage with the at least one guide rail.

13. A guide system according to claim 1, wherein the guide system (1) includes a retraction mechanism which facilitates retraction of the guide system (1) from engagement with the at least one guide rail.

14. A guide system connected to axle of vehicle, comprising; a guide assembly with two inclined guidance wheels displaceable along at least one ground guide rail provided in the ground;

wherein the guide assembly is a directional unit (1) formed of two separate adjacent arms (2 and 3) which are each separately pivotable about an axis (7) extending transverse of the vehicle; each of the two separate adjacent arms (2 and 3) supports an inclined guidance wheel (12, 13 or 14, 15) adjacent a free extremity thereof which is engageable for movement along said at least one ground guide rail; a coupling restraint acts on the two separate adjacent arms (2 and 3) and a contact shoe biases both of the two separate adjacent arms (2 and 3) toward engagement with the at least one ground guide rail to facilitate constant engagement therewith during use of the guide system; and the guide system further includes a lateral clearance follower-limiter module (47) provided with a pair of inclined guidance wheels, the lateral clearance follower-limiter module (47) is provided behind and is pivotably attached to the axle (8) of the vehicle, and the lateral clearance follower-limiter module (47) is laterally displaceable, along an arc CD centered on a mid-point A of the two contact points of the pair of inclined guidance wheels of the guide assembly, to an extent permitted by deformable articulations (61).

15. A guide system according to claim 14, wherein the two separate adjacent arms (2 and 3) are pivotably articulated to the axle (8) via a succession of axle elements arranged in an arc CD centered on a mid-point A of the contact points of the two front guidance wheels.

16. A guide system according to claim 14, wherein the deformable articulations are formed by bearing elements, each supporting an axle element through a deformable flexible connector.

17. A guide system connected to an axle of vehicle, comprising; a guide assembly with two inclined guidance wheels displacable along at least one ground guide rail provided in the ground;

wherein the guide assembly is a directional unit (1) formed of two separate adjacent arms (2 and 3) which are each separately pivotable about an axis (7) extending transverse of the vehicle; each of the two separate adjacent arms (2 and 3) supports an inclined guidance wheel (12, 13 or 14, 15) adjacent a free extremity thereof which is engageable for movement along said at least one ground guide rail; a coupling restraint acts on the two separate adjacent arms (2 and 3) and a contact shoe biases both of the two separate adjacent arms (2 and 3) toward engagement with the at least one ground guide rail to facilitate constant engagement therewith during use of the guide system; and the guide system further includes an identical guidance assembly which is laterally movable by lateral displacement along the pivot axle, the identical guidance assembly is provided behind the axle and is provided with a pair of inclined guidance wheels, an immobilization device is coupled to the identical guidance assembly, and when the immobilization device is inactive, the identical guidance assembly serves as a lateral clearance follower-limiter module.

* * * * *